US005111216A

United States Patent [19]

Richardson et al.

[11] Patent Number: 5,111,216

[45] Date of Patent: May 5, 1992

[54] TAPE SUPPLY CARTRIDGE FOR PORTABLE THERMAL PRINTER

[75] Inventors: Michael M. Richardson, Scottsdale; Edwin L. Swartout, Glendale, both of Ariz.

[73] Assignee: Kroy Inc., Scottsdale, Ariz.

[21] Appl. No.: 217,962

[22] Filed: Jul. 12, 1988

[51] Int. Cl.[5] .......... G01D 15/10; B41J 3/24; B41J 3/20; B44C 7/00

[52] U.S. Cl. .......... 346/76 PH; 346/136; 101/93.07; 101/288; 235/432; 156/384; 156/577; 156/DIG. 48; 156/DIG. 49; 400/88; 400/193; 400/120; 400/613

[58] Field of Search .......... 346/76 PH, 136; 400/88, 400/193, 208, 613, 120; 101/332, 93.07, 288; 156/DIG. 40, 99, 384, 577; 235/432

[56] References Cited

U.S. PATENT DOCUMENTS

| | | | |
|---|---|---|---|
| 3,222,242 | 12/1965 | Ingalls et al. | 156/584 |
| 4,264,396 | 4/1981 | Stewart | 156/361 |
| 4,385,958 | 5/1983 | Long | 156/361 |
| 4,407,692 | 10/1983 | Torbeck | 156/350 |
| 4,488,671 | 12/1984 | Hamisch, Jr. | 226/79 |
| 4,498,947 | 2/1985 | Hamisch, Jr. et al. | 156/384 |
| 4,525,237 | 6/1985 | Clar | 156/540 |
| 4,576,311 | 3/1986 | Horton et al. | 221/73 |
| 4,584,047 | 4/1986 | Vanderpool et al. | 156/361 |
| 4,614,561 | 9/1986 | Mistyurik | 156/384 |
| 4,660,739 | 4/1987 | Dooley et al. | 221/70 |
| 4,680,078 | 7/1987 | Vanderpool et al. | 156/352 |
| 4,706,095 | 11/1987 | Ono et al. | 346/76 PH |
| 4,716,291 | 12/1987 | Sakamoto et al. | 250/318 |
| 4,734,713 | 3/1988 | Sato et al. | 346/76 PH |

FOREIGN PATENT DOCUMENTS

| | | | |
|---|---|---|---|
| 61-29563 | 2/1986 | Japan | 400/193 |

*Primary Examiner*—Bruce A. Reynolds
*Assistant Examiner*—Gerald E. Preston
*Attorney, Agent, or Firm*—Dorsey & Whitney

[57] ABSTRACT

A tape supply including a replaceable tape supply cartridge for a portable, hand held thermal printing or transfer device having a receiving pocket, a supply of tape, a tape pathway aligned with the printhead and the mechanism for sensing relative movement between the device and the substrate and a structure to facilitate manual advancement of tape by pulling the tape past the printhead. The invention also relates to a thermal device having a self contained tape supply cartridge wherein the tape is advanced by manually pulling the tape past the printhead.

30 Claims, 5 Drawing Sheets

TAPE SUPPLY CARTRIDGE FOR PORTABLE THERMAL PRINTER

BACKGROUND OF THE INVENTION

The present invention relates generally to a thermal printer or transfer device and a tape supply cartridge therefor. More particularly, the present invention relates to a portable, hand held thermal device having a manual tape advance for creating an image of characters onto a strip of image carrying tape as the result of localized application of heat and pressure and an improved tape supply cartridge which significantly enhances the applicability and usefulness of such device.

There are a number of desktop strip printing or transfer type devices which currently exist in the prior art and which are utilized to transfer characters from a strip of color carrying ribbon to a strip of image carrying tape. One such device employs impact or pressure in combination with a font having raised characters to transfer, by such impact or pressure, an image of a selected character from a ribbon to an image receiving tape. These so-called impact or pressure lettering devices have existed since the mid-1970s and representative examples are described in U.S. Pat. Nos. 3,834,507; 4,243,333; 4,402,619 and 4,624,590, among others. Cartridges for supplying tape and ribbon to these devices are described in U.S. Pat. Nos. 4,226,547; 4,391,539 and 4,678,353, among others.

Thermal printing or transfer devices also exist in which an image of a desired character is formed onto a strip of image carrying tape by printing directly onto specially treated thermal tape or by transferring ink or other color from a color carrying ribbon to such tape as a result of the localized application of heat and a small amount of pressure. A typical desktop thermal transfer device of this type is described in U.S. Pat. No. 4,666,319 dated May 19, 1987 and issued to Hirosaki et al.

Other hand held labelers and printers or transfer devices utilizing thermal technology also exist as represented by U.S. Pat. Nos. 4,734,713; 4,264,396 and 4,407,692, among others. Still other thermal transfer devices currently exist which employ a machine for transferring the image of a desired character from a strip of ribbon to a strip of tape and a cooperating tape ribbon cartridge usable with the device for providing a supply of tape and ribbon to the machine transfer station.

More recently, several products have been introduced which utilize thermal transfer technology and which are hand held, portable devices which embody a self-contained keyboard or other data input means, a replaceable ribbon supply within the device housing and a thermal printhead associated with the ribbon for transferring an image of a selected character from the ribbon to a flat substrate. One of these products is manufactured by Casio Computer Co., Ltd. of Japan and is identified as the "HANDY WRITER HW 7". Another such device is manufactured by Plus Corporation of Japan and is identified as the "WORD RUNNER". Each of these devices functions by first inputting data which reflects the characters desired to be printed into a data storage means. The device is then placed, bottom edge down, onto a sheet of paper supported by a flat surface. As the device is moved across the paper, with the printhead in engagement therewith, the image of the desired characters is transferred from the ribbon to the sheet of paper. The result is an inexpensive way to generate high quality lettering on a flat sheet of paper.

A similar device is a hand held printer in which the print data is transferred to the printer, via a cable or other means, from a remote input means such as a personal computer or the like. Such a hand held printer, which prints in a manner similar to the above described Casio and Plus Corporation devices, is manufactured by Toshiba of Japan and is known as the RUPO product line. In this RUPO product line the personal computer is Model JW80F, whereas the hand held computer accessory is Model JWT2087A.

Although the recently introduced products described above are much simpler, less expensive and more portable than existing thermal devices, there are several drawbacks. First, the ability of the user to accurately align the device so that he or she knows exactly where the printing is going to occur is difficult at best. During the operation of these products, one cannot visually observe where the printing is actually taking place. Some have developed special rulers with marks to locate where the device will print; however, this has not satisfactorily overcome the problems. Further, even if the printing was started in the right place, the speed and angle of movement of the thermal device across the paper and the amount of pressure exerted are variable and subject to human error. Thus, unless the device is moved in a straight line across the paper, the printed characters will not be accurately placed. Still further, the device cannot be repositioned once the printing has started. Thus, limitation in alignment accuracy is a serious problem with these current products.

Secondly, such products are only useful if the characters are printed onto a flat surface with sufficient room to accommodate the product. The product is of no use whatsoever if one desires to print on a curved surface, a surface which has a rough texture or a surface which is not large enough to accommodate the device. Thus, these current devices have serious limitations with respect to their ability to print on all types and sizes of surfaces.

Accordingly, there is a need for a portable, hand held thermal device which is light weight and inexpensive, but which also provides all the advantages of the larger, desktop devices in terms of alignability of the printed characters and the ability of the device to be used to print characters on surfaces of different contours, texture and sizes.

SUMMARY OF THE INVENTION

In accordance with the present invention, a tape supply cartridge is provided for presently existing hand held, portable thermal transfer devices which are designed to print by manually sliding the bottom edge of the device, and thus the printhead, across a flat surface. The tape supply cartridge of the present invention permits the characters to be printed onto a strip of adhesive backed tape so that the same can be placed onto and secured to the desired substrate. By printing or transferring the characters onto such a piece of tape, the alignment problems alluded to above are overcome because the tape can be accurately aligned relative to the substrate before it is secured thereto. Further, the inconsistencies caused by human error are eliminated. Still further, when the characters are printed or transferred onto a strip of tape, the tape bearing the characters can be secured to surfaces of different contours, textures and sizes which is not possible with the current devices. For example, the tape can be applied to cylindrical or other curved surfaces, to rough or irregular surfaces as well as to surfaces which are difficult, or impossible, to reach with the devices described above. Thus, the cartridge of the present invention provides a consistent print surface which insures high quality and consistent printing.

The tape supply cartridge of the present invention includes means for operatively connecting the cartridge to the thermal device, a supply of image receiving tape contained within a tape supply housing at one end of the cartridge, and a tape pathway for directing the tape from the tape supply housing past the operative components of the transfer device and out through an opening at the opposite end of the cartridge. Included along the tape pathway is a first area where the tape contacts a drive roller means of the transfer device and insures that movement of the tape causes corresponding rotation of such drive roller means. In the preferred embodiment of the cartridge for such device, a leaf spring member is provided below the tape to urge the same against the drive roller.

A second area along the tape path defines the print or transfer station where the printhead prints or transfers the desired characters onto the tape. Because the printhead is normally spring mounted, this print station can be a flat surface which provides resistance to the printhead or it can comprise one or more spring mounted rollers to provide consistent printing or transfer pressure against the bottom surface of the tape in a direction toward the printhead.

The cartridge also includes an opening at the end of the tape path so that the tape can exit from the cartridge to provide an area where the end of the tape can be grasped and manually pulled past the printhead. Preferably means are also included on the exterior of the cartridge so that the tape can be severed when the printing operation is complete. This means should be positioned such that when the tape has been severed, an end portion of sufficient length remains to permit the same to be manually grasped for the next cycle.

It should also be noted that the tape supply cartridge differs from prior devices in that the tape is supplied, and the advancement and printing or transfer mechanism of the device is actuated and controlled as a result of manually pulling the tape past the printhead. Thus, the cartridge of the present invention contemplates use with a device which has no motor or other means for driving the tape and/or ribbon advancement.

A further aspect of the present invention is the provision of a thermal printer or transfer device in which the tape supply is incorporated into a replaceable cartridge either within the device housing or as an attachment to the exterior of such housing and in which the tape is advanced, without the use of any motorized or other electronic mechanism, by manually pulling the tape past the printhead. Such a device includes a means to support the tape supply, means to insure that the tape is biased against the printhead with sufficient force to cause printing or transfer of the desired characters and means for detecting the speed and amount of movement of the tape as it is manually pulled from the cartridge so that such information can be utilized to control the speed at which the characters are printed onto the tape.

Accordingly, it is an object of the present invention to provide a tape supply cartridge which is retrofittable to existing portable, hand held thermal devices for the purpose of improving alignment and usefulness of the device.

Another object of the present invention is to provide a snap on tape supply cartridge for a portable, hand held transfer device.

Another object of the present invention is to provide a snap on tape supply cartridge for a thermal transfer device in which the tape is advanced past the print station by manually pulling the tape from the tape supply.

Another object of the present invention is to provide a portable, hand held thermal device which eliminates the printing quality and alignment inconsistencies caused by human error and insures high quality printing by providing a consistent print surface.

A further object of the present invention is to provide a thermal device in which the device includes a replaceable supply and in which the tape is advanced past the printhead by manually pulling the same through the system.

These and other objects of the present invention will become apparent with reference to the drawings, the description of the preferred embodiment and the appended claims.

DESCRIPTION OF THE PREFERRED EMBODIMENT

Figure 1:
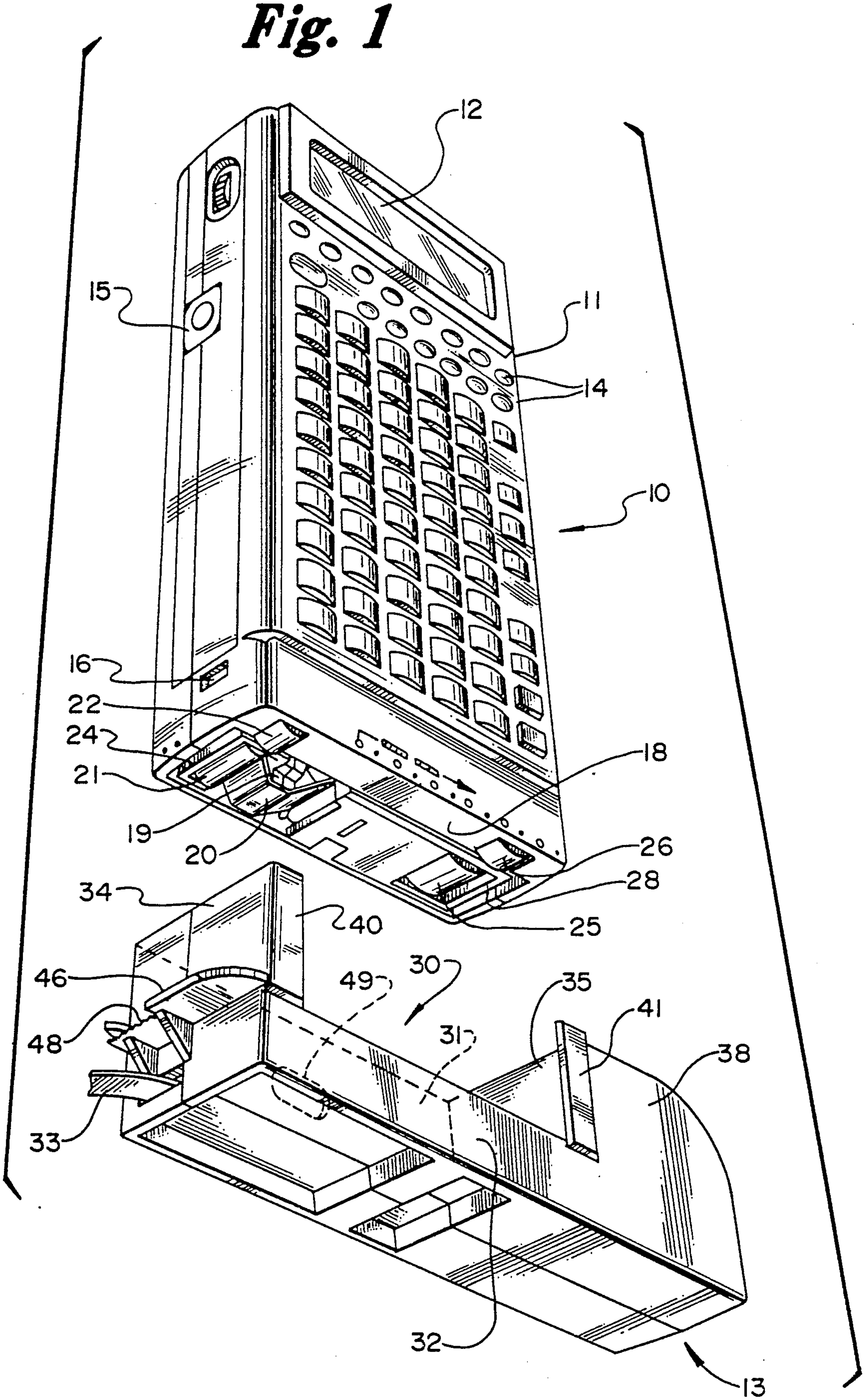
FIG. 1 is a pictorial, broken apart view showing a presently existing portable, hand held thermal device and a retrofittable, snap on tape supply cartridge in accordance with the present invention.

Reference is first made to FIG. 1 comprising a pictorial, broken apart view illustrating a presently existing portable, hand held thermal transfer device 10 and a tape supply cartridge 13 in accordance with the present invention. The transfer device 10 is a product manufactured by Casio Computer Co., Ltd. of Japan and identified as a HANDY WRITER HW 7. It is a generally rectangularly shaped device whose size approximates that of a large, hand held calculator. The device 10 includes a generally rectangular housing 11 having front and back sides, a pair of parallel side edges, a top edge and a bottom or print edge 18.

The front face of the device 10 is provided with a plurality of keys 14 for the purpose of inputting data such as the characters desired to be printed and for controlling the same. The front face also includes a liquid crystal display screen 12 for displaying the characters which have been inputted into the device and various other useful information. A print button 15 is provided on the left side edge of the housing 11, while an "on/off" switch (not shown) is positioned on the right side edge of the housing 11. A recessed notch 16 is provided near the lower portion of each side edge of the housing 11. Only the notch 16 in the left side edge 16 is shown in FIG. 1; however, a similarly positioned recessed notch 16 (FIG. 6) is also formed in the right side edge of the housing 11. These recessed portions 16 are used, as will be described in greater detail below, to retain the tape supply cartridge 13 in operative relationship relative to the device 10.

Figure 5:
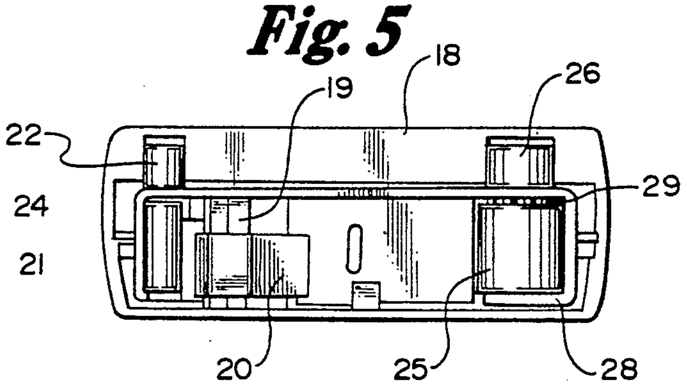
FIG. 5 is an elevational view of the bottom or print edge of the thermal transfer device illustrated in FIG. 1.
Figure 6:
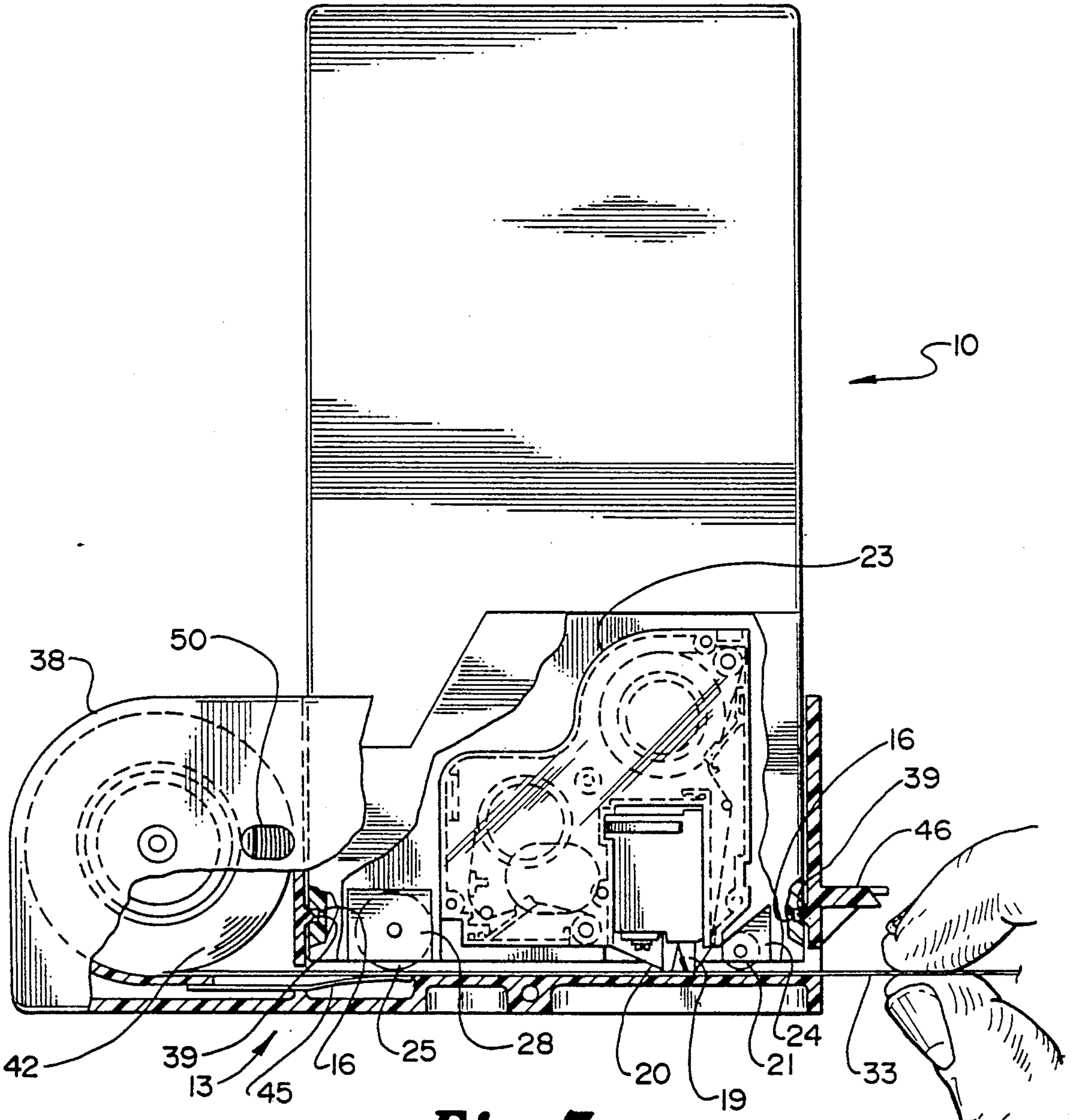
FIG. 6 is a front elevational view showing the thermal device and the tape supply cartridge connected with one another and in position for printing with the back cover of the device removed and portions of the device and cartridge broken away and in section.

The bottom or print edge 18 and operative components of the device 10 are generally illustrated in FIG. 1 and more specifically illustrated in FIGS. 5 and 6. The bottom edge 18 includes a portion of the housing 11, a thermal printhead 19, a pair of drive or tape movement sensing rollers 25 and 26 and a pair of idler rollers 21 and 22. As shown best in FIG. 6, the printhead 19 extends slightly below the outer surface of the bottom edge 18. In the preferred embodiment, the printhead 19 is spring mounted so that a force of preselected magnitude exerted against the printhead 19 in the direction of the housing 11 will cause the printhead 19 to move inwardly against the force of its spring mount.

In the preferred embodiment, a supply of thermal transfer ribbon 20 is embodied within the housing 11 on a ribbon supply and take-up cartridge 23 (FIG. 6). The ribbon 20 extends from the cartridge 23, around the outer portion of the printhead 19 and then back into the cartridge 23 to be rewound onto a take-up spool. The ribbon supply is included because the device 10 utilizes thermal transfer technology in which an image of a selected character is transferred from the ribbon to a desired substrate. It is contemplated, however, that a similar thermal device could be constructed in which the ribbon is eliminated. In a device of this type, however, the substrate or tape must be specially treated so that printing occurs directly onto such substrate or tape as a result of the application of heat and pressure.

The pair of rubber-like idler rollers 21 and 22 are supported at one end of the bottom edge 18 on a common shaft which in turn is journalled within the yoke member 24. The yoke 24 is fixedly secured to the frame of the device 10. The rollers 21 and 22 are independently rotatable about a common axis, and are truly idler rollers in that they are not connected to any other gears or motion transfer mechanisms.

The other end of the bottom edge 18 is provided with a pair of rubber-like drive or tape movement sensing rollers 25 and 26. The rollers 25 and 26 are also mounted on a common shaft which in turn is journalled to the yoke member 28. The yoke 28, like the yoke 24, is fixedly secured to the frame of the device 10. The rollers 25 and 26 are designed to rotate in unison and are provided with an antireverse mechanism or one-way clutch to permit rotation in one direction only. The rollers 25 and 26 are connected with a sprocket member 29 which in turn is connected to a plurality of sprocket or gear members to control advancement of the ribbon and the flow of print data to the printhead 19 in a manner known in the prior art. The rollers 25 and 26 are referred to as drive rollers in that their rotation, as a result of engagement with the substrate as will be described below, drives the ribbon advancement and controls the providing of data to the printhead 19.

Neither the idler rollers 21 and 22 nor the drive rollers 25 and 26 are spring mounted relative to the frame of the device 10. Further, as illustrated best in FIG. 6, both the idler rollers 21 and 22 and the drive rollers 25 and 26 extend slightly below the outer surface of the bottom edge 18.

The thermal device 10 is normally operated by inputting certain data into the device through the keys 14. When this has been done, the print button 15 and possible other buttons are depressed. The bottom edge 18 is then placed onto a flat substrate such as a sheet of paper on a table, and the device is manually moved across the paper toward the right. As a result of this movement, the rubber like drive rollers 25 and 26 rotate because of frictional engagement with the paper. This rotation causes activation of the printhead 19, movement of the ribbon 20 past the printhead 19 and the transfer of the desired characters from the ribbon 20 onto the paper.

In the device 10 described in the present application, means known in the art are included for advancing the ribbon in accordance with the rate at which the device is manually moved along the paper by the user and for controlling the data output rate to the printhead so that the speed of printing or transfer is directly responsive to the speed at which the device is moved across the paper. In the device 10 illustrated and described in the present application, a series of toothed gears are utilized to coordinate these functions. Specifically, in the device 10 an optical shaft encoder or other similar means is utilized to detect when and at what speed the device is being moved across the paper to permit synchronization and control of the data output rate to the printhead 19. Both the advancement of the ribbon 20 and the data output rate to the printhead 19 are thus controlled by the rotation of the drive rollers 25 and 26. Such rotation, in turn, is responsive to the speed at which the device is moved across the paper.

Having described the thermal transfer device 10 with which the tape supply cartridge of the present invention has particular usefulness, the cartridge 13 can be described best with reference to FIGS. 1, 2, 3, and 4. In general, the tape supply cartridge 13 includes a receiving pocket 30 for receiving the lower end of the thermal device 10. The receiving pocket 30 is defined on the back by the rearward wall 31, on the front by the lower edge or wall portion 32 and the front edge portions 40 and 41 and on the sides by the pair of generally parallel side walls 34 and 35. The rearward wall 30 is a generally rectangular shaped wall portion having an opening 49 to facilitate viewing of the remaining ribbon supply within the device 10. The forward wall includes the lower edge portion 32 which is disposed generally parallel to the back wall 31 and the pair of front edge portions 40 and 41 which extend upwardly from each end of the lower portion 32.

Figure 2:
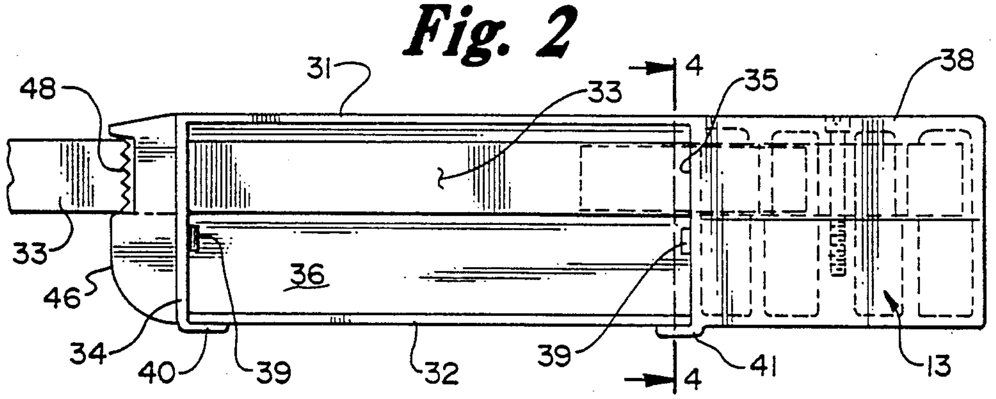
FIG. 2 is a top, elevational view of the tape supply cartridge of the present invention.
Figure 3:
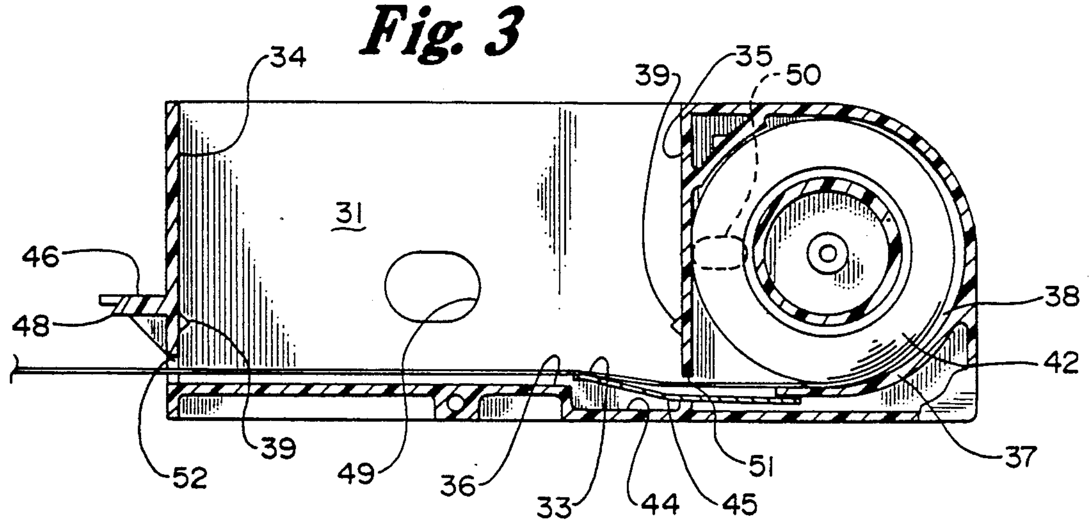
FIG. 3 is a view, partially in section, of the tape supply cartridge of the present invention as viewed along the section line 3—3 of FIG. 2.

The side edges of the rearward wall 31, the side walls 34 and 35 and the front wall (the lower wall 32 and edge portions 40 and 41) are serially connected to one another to define the receiving pocket 30. The bottom of the pocket 30 is defined by the bottom surface 36 (FIGS. 2 and 3). In the preferred embodiment, the size and configuration of the pocket 30 approximate the exterior size and configuration of the lower end of the device 10.

As best illustrated in FIG. 2, each of the edge wall portions 34 and 35 is provided with a retaining tab member 39. These retaining tabs 39 are adapted for corresponding retaining engagement with the recessed portions or notches 16 of the thermal device 10. The position of the tabs 39 is such that when the device 10 is inserted in the pocket 30, the tabs 39 engage the recessed portions 16 and retain the device 10 firmly within the cartridge pocket 30 and in a position insuring operative engagement between the printhead 19 and drive rollers 25 and 26 on the one hand, and the corresponding portions of the cartridge on the other.

While the receiving pocket 30 illustrated in the preferred embodiment has four sides and a bottom, it is contemplated that the pocket 30 could have other configurations, provided the functions of receiving and aligning the device 10 relative to the cartridge are accomplished. For example, the pocket could comprise only portions of the four walls or corresponding alignment and receiving posts and openings in the device 10 and tape supply 13.

Figure 4:
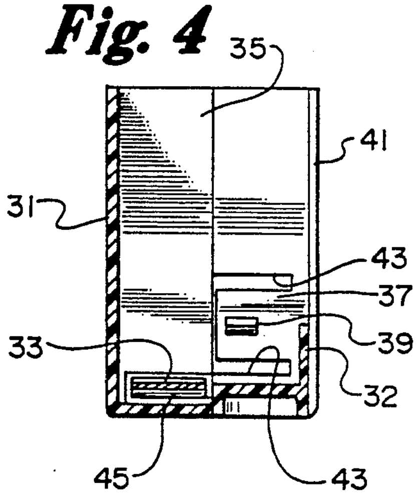
FIG. 4 is a view, partially in section, of the tape supply cartridge of the present invention as viewed along the section line 4—4 of FIG. 2.

As illustrated best in FIG. 4, the tab 39 provided in the side wall 35 is disposed on a tab or cantilevered flexure 37. The flexure 37 is integrally joined at one end (the right hand end as viewed in FIG. 4) to a portion of the side wall 35, with the opposite end (the left hand end as viewed in FIG. 4) being a cantilevered or free end. The sides of the flexure 37 are separated from the side wall 35 by a pair of slots 43. This structure permits the flexure 37, and thus the tab 39 connected therewith, to be depressed inwardly to accommodate insertion of the device 10 into, and removal of the device 10 from, the pocket 30.

Figure 11:
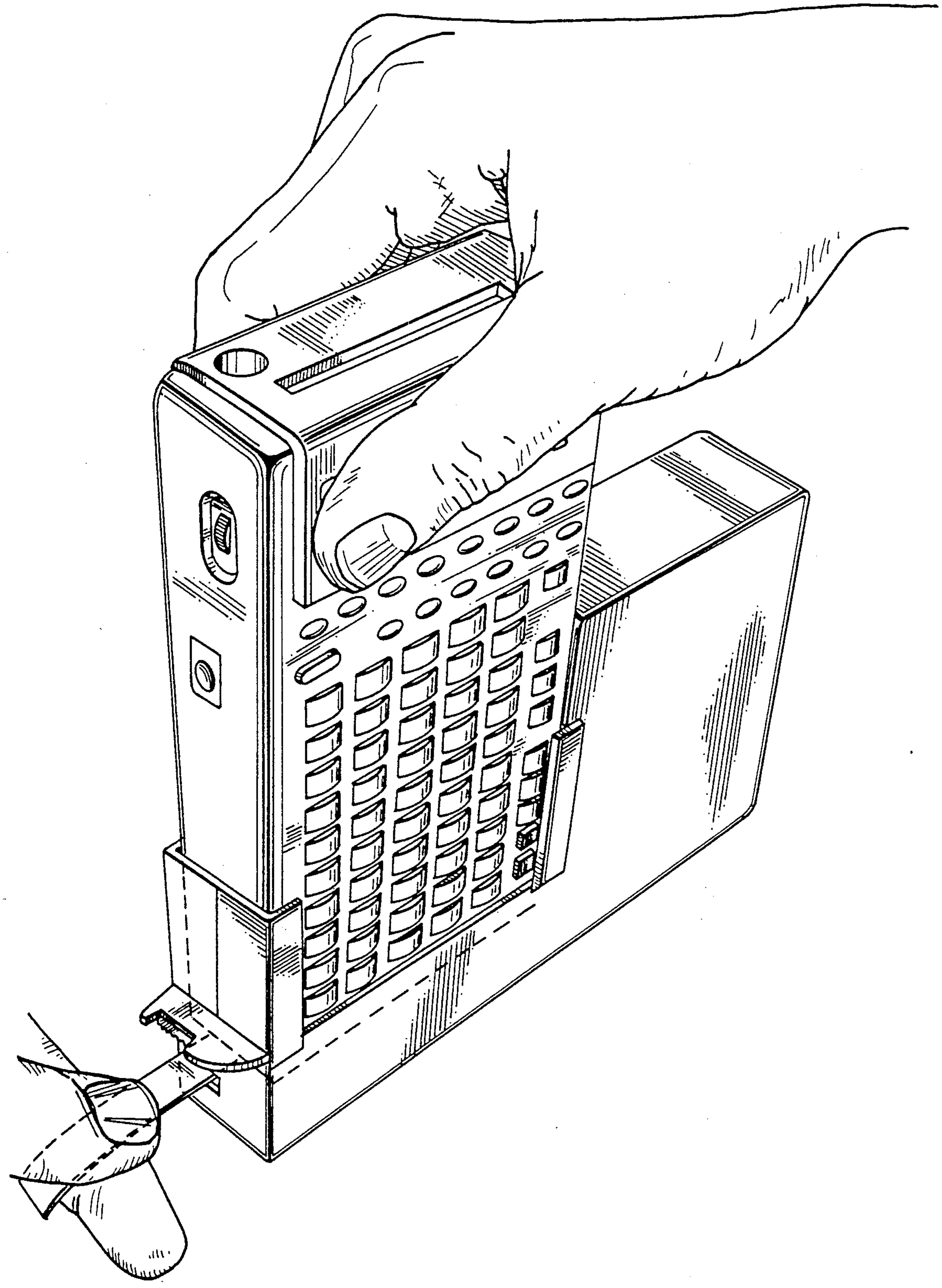
FIG. 11 is a pictorial view of a portable thermal device useable with an alternate tape supply means.

In the preferred embodiment, the means for retaining the device 10 relative to the cartridge 13 comprises the recessed portions 16 and the tabs 39. It is contemplated, however, that other connection means could be utilized. It is also contemplated that the tape supply could comprise a desktop stand or other device having a tape supply and a printer receiving pocket in which the printer or transfer device is manually held or biased within the pocket while the print or transfer operation is occurring. An example of this latter structure is illustrated in FIG. 11.

The cartridge 13 also includes a tape supply housing portion 38 positioned on the right hand end of the cartridge as viewed in FIGS. 1, 2 and 3. The housing 38 contains a spool 42 or other supply of tape 33 (FIG. 3). It is contemplated that the spool 42 could be rotatably supported on a shaft (not shown) or merely supported by the side and edge walls of the housing 38. In the preferred embodiment, the tape 33 is guided, in part, by the curved guide surface 37 within the housing 38. A viewing opening 50 (FIGS. 3 and 6) is provided in the tape supply housing so that the user can visually determine the amount of tape left in the housing portion 38.

As illustrated best in FIGS. 2, 3 and 4, the tape 33 from the spool 42 exits from the tape supply housing 38 through an opening 51 below a lower edge portion of the side wall 35 and extends along a tape pathway until it exits from the cartridge 13 through the tape exit opening 52 formed within a portion of the side wall 34. As shown in FIG. 2, the tape pathway is defined on one side of the cartridge 13 so that the tape 33 will be in operative engagement with the printhead 19, the idler roller 21 and the drive roller 25 when the device 10 is inserted into the pocket 30.

With reference to FIG. 3, means is illustrated for insuring engagement between the tape 33 and the drive roller 25 (FIG. 1). In the preferred embodiment, this means includes a cantilevered leaf spring member 45 which is secured near one end to a portion 44 of the cartridge 13 and which extends upwardly so that its free end is above the bottom surface 36 of the pocket 30. This causes the spring 45 to exert a generally upward force against the bottom surface of the tape 33. The outermost, cantilevered end of the spring member 45 is aligned with the drive roller 25 so that when the device 10 is inserted into the pocket 30, the spring 45 biases the tape 33 against the drive roller 25.

A second portion of the tape pathway includes means to resist the spring mounted printhead 19 so that the required printing or transfer force can be generated between the tape pathway and the printhead 19. In the preferred embodiment this printhead resisting portion comprises a flat surface portion.

A tape cut-off member 46 is integrally formed with the outer surface of the side wall 34. As shown best in FIG. 2, this cut-off member 46 includes a serrated edge 48 for severing and removing tape 33 after printing has occurred. It should be noted that the serrated edge 48 is positioned outwardly and upwardly from the tape exit opening 52. Thus, when the tape is severed, a short end portion will remain extended outwardly through the opening 52 to permit the end of the tape 33 to be manually grasped and pulled from the cartridge during the next printing step. It is also contemplated that the tape cut-off portion 46 could be positioned below the tape exit opening 52. However, it is still desirable for the cut-off edge 48 to be spaced from the opening 52, either outwardly or in a vertical direction (either up or down), or both, to permit a section of tape 33 to extend past the opening 52 after it has been severed.

Figure 7:
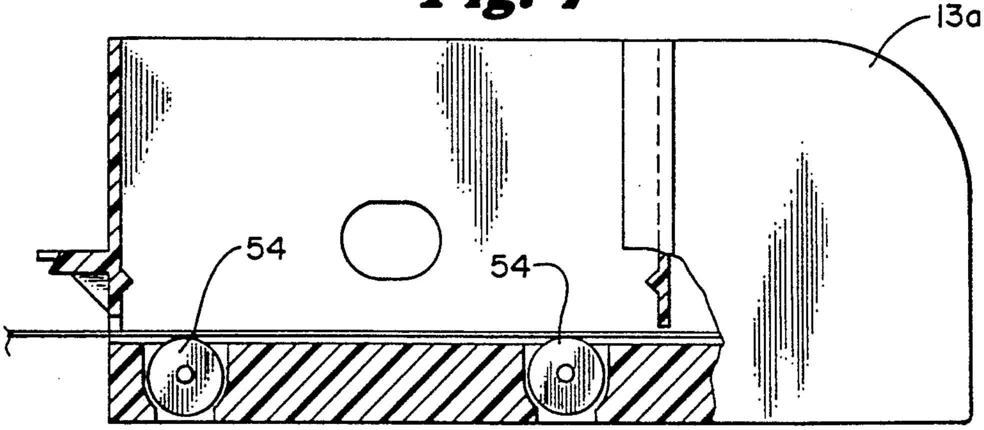
FIG. 7 is an alternate embodiment of a tape supply cartridge in accordance with the present invention.
Figure 8:
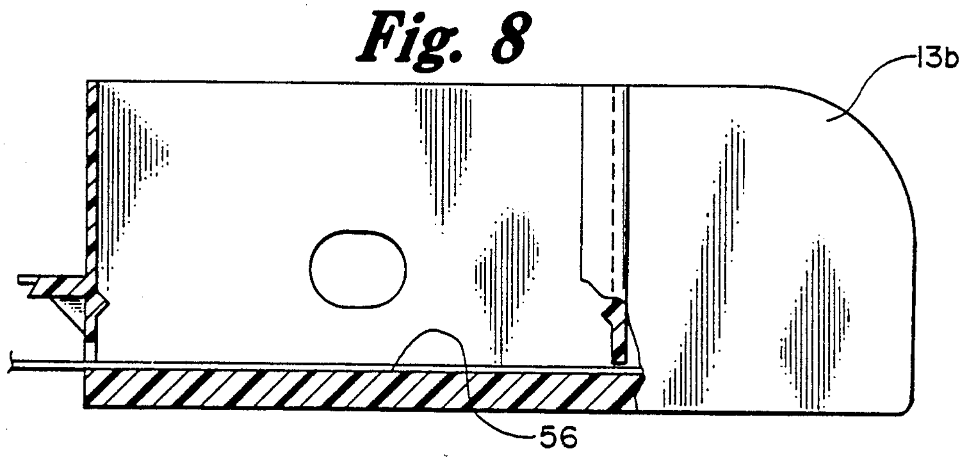
FIG. 8 is a further alternate embodiment of a tape supply cartridge in accordance with the present invention.

FIGS. 7 and 8 illustrate possible alternate embodiments of the tape supply cartridge. Specifically, it is contemplated that the structure of the cartridge, and in particular, the configuration of the cartridge receiving pocket, the means for connecting and/or retaining the cartridge with respect to the device and the specific means for causing and insuring engagement between the tape and the printhead and drive roller will depend almost entirely on the nature of the device in question. It is contemplated, however, that all of the thermal devices with which the tape supply cartridge of the present invention is intended for use will have a drive roller or other similar means for sensing or detecting when the tape 33 is being moved and the speed at which it is being moved. Similarly, it is contemplated that all such thermal devices would have a thermal printhead extending slightly outside of an outer surface of the device. The cartridge of the present invention which is designed for use with such devices must include means for insuring appropriate engagement between the tape 33 and these two operative elements of the device.

In the preferred embodiment of the cartridge 13 and the device 10 illustrated in FIG. 1, the printhead 19 is spring mounted. Thus, a flat surface, such as the bottom wall 36 of the pocket 30 is sufficient to cause engagement between the tape and the printhead 19 when the device is properly retained by the tabs 39 and the recessed portions 16. However, because the drive roller 25 of the device 10 is rotatably mounted to the frame of the device 10, with no spring mount, it is desirable for the cartridge 13 to be provided with a means for biasing the tape into engagement with the drive roller 25. In the preferred embodiment, this means includes the leaf spring 45 (FIG. 3).

Figure 9:
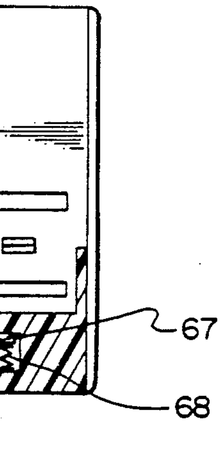
FIG. 9 is a view, partially in section, illustrating how the spring mounted rollers in the alternate embodiment of FIG. 7 could be supported.

As illustrated in the alternate embodiment of FIG. 7, it is contemplated that a roller member 54 could be substituted for the leaf spring 45 of the preferred embodiment (FIG. 3). It is also contemplated that a roller 55 could be used as a backing or platen to provide resistance for the printhead 19. It is also contemplated that either of these rollers 54 or 55 could be rotatably mounted within the cartridge 13*a* about a fixed axis or rotatably supported about a spring mounted axis. A roller mounted on a spring mounted axis could be utilized to insure the generation of a certain force against the drive roller or other tape motion sensing element or the printhead. If a spring mounted roller is desired, it could have a structure similar to that of FIG. 9 in which each end of the roller shaft 67 is supported by a coil or other spring 68.

The alternate embodiment of the cartridge 13*b* of FIG. 8 contemplates that the tape path from the tape supply housing to the tape exit opening could comprise a flat surface. Such a structure would normally contemplate a spring mounted printhead as well as a spring mounted or rubberized or cushioned drive roller which would be depressed to some extent when the device is inserted into the cartridge.

Figure 10:
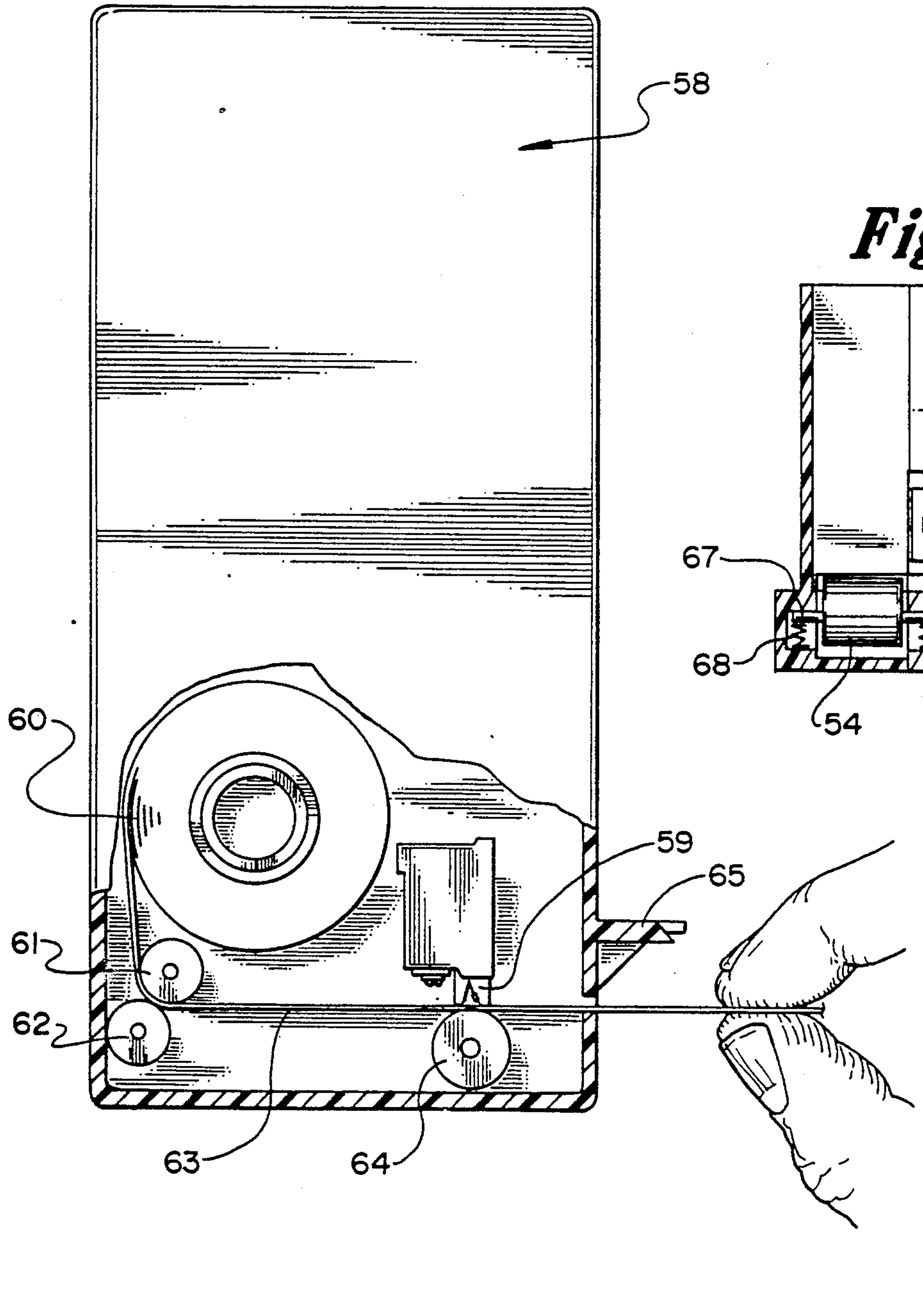
FIG. 10 is a schematic illustration of a thermal printing or transfer device in accordance with the present invention.

FIG. 10 illustrates an alternate embodiment for a thermal device of the type discussed above except that the tape supply is not provided by a separate, retrofittable, snap on cartridge, but is provided by a replaceable tape supply positioned within the housing of the cartridge itself. Such a device is illustrated by reference numeral 58 in FIG. 10 and includes a printhead 59 which can be similar or identical to the printhead 19 of the device 10 of FIG. 1. A means in the form of a platen 64 journalled to the frame of the device 58, is also provided to resist the printhead 59 for the purpose of creating the print or transfer force needed between the printhead 59 and the platen 64. It is contemplated that the means for creating this force could be in the form of a spring mounted printhead 59, a spring mounted platen 64, or both. It is also contemplated that the platen could consist only of a flat surface similar to the bottom surface 36 of the pocket 30 illustrated in FIG. 3.

The thermal device 58 also includes a tape supply 60, a drive roller 61 and a means for insuring engagement between the drive roller 61 and the tape 63 so that upon movement of the tape 63 as a result of manually pulling the same from the device 58, the roller 61 will be caused to rotate. In the embodiment illustrated in FIG. 10, this means includes an idler roller 62 which presses the tape 63 against the roller 61 and causes rotation of the roller 61 as the tape is moved. It is contemplated that the roller 62 could be spring mounted or merely constructed of a depressable material. It is also contemplated that the roller 62 could be spring mounted or replaced by a leaf spring member (of the type illustrated in FIG. 3) or by a flat surface of the type illustrated in the alternate embodiment of FIG. 8.

In the device 58 of FIG. 10, a cut-off member 65 is formed with the outer surface of the device to permit the tape 63, which extends outwardly through the opening 66, to be selectively severed. Similar to the cut-off portion 46 of the preferred cartridge, it is desirable for the cut off edge of the cut-off portion 65 to be spaced from the tape exit opening 66 to allow a section of tape to remain outside of the device after it has been severed so that it can be manually grasped and pulled during the next print or transfer operation. It should also be noted that the drive roller 61 is connected, via appropriate gear or other means, to a mechanism for sensing when and how fast the roller 61 is rotating so that the data output to the printhead 59 can be controlled and synchronized with the movement of the tape 63.

It should also be noted that the device 58 is a thermal printer device rather than a thermal transfer device. Thus, it does not embody a supply of transfer ribbon. Instead, the tape 63 is constructed of a special thermal material on which the image is directly formed as a result of the applied heat and pressure. It is contemplated that the device 58 could also be provided with a supply of ribbon similar to the embodiment of FIGS. 1 and 6.

Having described the structure of the tape supply cartridge and the thermal device of the present invention, the operation can be understood as follows. First, the thermal device, such as the device 10 of FIG. 1, is inserted into the receiving pocket 30 of the cartridge 13 until the tabs 39 (FIG. 2) snap into the recessed portions 16 as illustrated best in FIG. 6. In this position, the spring mounted thermal printhead 19 is biased against the bottom surface 36 of the pocket 30 with the tape 33 and ribbon 20 disposed therebetween. In this position, the drive roller 25 is also in engagement with the top surface of the tape 33 and the leaf spring 45 biases the tape 33 upwardly against the roller 25. It should be noted that the relative positions of the tabs 39 and recessed notches 16 are such that the above engagement is insured.

After the data representing the characters to be printed has been input into the device, the appropriate print and control buttons are actuated. The end of the tape 33 extending out of the cartridge 13 is then manually grasped and pulled. As a result of this manual pulling action on the tape 33, the drive roller 25 is caused to rotate. This in turn causes corresponding advancement of the ribbon 20 and also control of the data output rate from the device 10 to the printhead 19 so that synchronization can be achieved between the movement of the tape 33 and the printing operation.

When the printing or transfer operation is completed, the tape is severed by using the serrated edge 48 (FIG. 2). This leaves a short end section so that the same can be manually grasped during the next printing operation.

The operation of the alternate embodiment of the thermal device 58 illustrated in FIG. 10 is substantially the same, except that the tape supply 60, the means 62 for insuring engagement between the tape 63 and the drive roller 61 and the means 64 for insuring sufficient print or transfer pressure are incorporated directly into the device 58. The tape is still advanced by manually pulling the tape 63 from the device.

Although the description of the preferred embodiment has been quite specific, it is contemplated that various changes and modifications could be made without deviating from the spirit of the present invention. Many of these modifications have been described above. However, they are not to be considered as being limited. Some of the modifications that could be made include, among others, the application of the features of the present invention to either a thermal printing device or a thermal transfer device and the application of the features of the present invention to a retrofittable, replaceable, snap on tape supply cartridge or a replaceable tape supply cartridge which is incorporated into the housing of the device.

Accordingly, it is intended that the present invention be dictated by the appended claims, rather than by the description of the preferred embodiment.

We claim:

1. A portable, hand held printing device for printing images of selected characters on a strip of tape comprising:

a thermal device having data input and storage means, a housing including an external print edge, a thermal printhead disposed within said print edge, sensing means within said print edge for sensing movement of said tape and means operatively connected with said sensing means for controlling said printhead in response to movement of said tape; and a separate tape supply cartridge having a supply of tape, a receiving pocket for receiving a portion of said thermal device embodying said print edge, a tape pathway defined by a portion of said receiving pocket for operatively aligning said tape with said printhead and sensing means and for insuring operative engagement between said tape and printhead and sensing means.

2. The device of claim 1 wherein said tape supply means comprises a replaceable tape supply cartridge having a supply of tape disposed at one end of said receiving pocket and a tape exit opening at the opposite end of said receiving pocket.

3. The device of claim 1 wherein said tape pathway includes first means for insuring operative engagement between said tape and said sensing means and second means for insuring operative engagement between said tape and said printhead, whereby said tape is advanced by manually pulling said tape from said tape supply means.

4. The device of claim 3 wherein said first means includes a leaf spring.

5. The device of claim 3 wherein said second means includes a flat surface portion.

6. The device of claim 1 wherein said thermal device is a thermal transfer device and includes a supply of ribbon.

7. The device of claim 1 wherein said print edge includes an exterior surface portion and each of said printhead and said sensing means includes a portion disposed outwardly past said exterior surface portion.

8. The device of claim 7 wherein said sensing means includes a rotatable roller.

9. The device of claim 1 wherein said tape supply means includes a tape cut off member.

10. The device of claim 9 wherein said receiving pocket includes a tape exit opening and wherein said tape cut off member is sufficiently spaced from said tape exit opening so that a manually graspable portion of tape extends past said tape exit opening after said tape has been severed.

11. The device of claim 1 having connection means for operatively retaining a portion of said thermal device within said receiving pocket.

12. The device of claim 11 wherein said receiving pocket includes an inside surface and said connection means includes a pair of first connection members formed on the inside surface of said receiving pocket and a corresponding pair of second connection members formed on a portion of said thermal device housing.

13. The device of claim 12 wherein said first connection means comprises a pair of tabs and said second connection means comprises a pair of recessed notches.

14. The device of claim 13 wherein one of said tabs is integrally formed with a flexure to facilitate limited movement of said one tab and insertion and removal of said thermal device relative to said receiving pocket.

15. A separate tape supply cartridge for a portable, hand held thermal printing device of the type having data input and storage means, a housing including an external print edge, sensing means for sensing relative movement between said device and a printing substrate and means operatively connected with said sensing means for controlling said printhead in response to said relative movement, said tape supply comprising:

a supply of tape;

a receiving pocket for receiving a portion of said thermal device embodying said print edge; and a tape pathway defined by a portion of said receiving pocket for operatively aligning said tape with said printhead and sensing means and for insuring operative engagement between said tape and said printhead and sensing means.

16. The tape supply of claim 15 having tape supply cartridge wherein said supply of tape is disposed at one end of said receiving pocket and a tape exit opening is disposed at the opposite end of said receiving pocket.

17. The tape supply of claim 15 wherein said tape pathway includes first means for insuring operative engagement between said tape and said sensing means and second means for insuring operative engagement between said tape and said printhead, whereby said tape is advanced by manually pulling said tape.

18. The tape supply of claim 17 wherein said first means includes a leaf spring.

19. The tape supply of claim 17 wherein said second means includes a flat surface portion.

20. The tape supply of claim 15 wherein said tape supply includes a tape cut off member.

21. The tape supply of claim 20 wherein said receiving pocket includes a tape exit opening and wherein said tape cut off member is sufficiently spaced from said tape exit opening so that a manually graspable portion of tape extends past said tape exit opening after said tape has been severed.

22. The tape supply of claim 15 including connection means for operatively engaging corresponding connection means on said thermal device for operatively retaining said portion of said thermal device within said receiving pocket.

23. The tape supply of claim 22 wherein said connection means includes a pair of connection members and said corresponding connection means includes a pair of corresponding connection members.

24. The tape supply of claim 23 wherein at least one of said pair of connection members is adapted for limited movement to facilitate insertion and removal of said thermal device relative to said receiving pocket.

25. The tape supply of claim 24 wherein said one of said pair of connection members is integrally formed with a flexure.

26. A portable, hand held thermal printing device for printing images of selected characters on a strip of tape comprising:

manual data input and storage means for electronically inputting and storing data defining the images of the selected characters;

a housing;

a thermal printhead disposed within said housing;

a manually advanceable supply of tape;

sensing means for sensing movement of said tape;

means operatively connected with said sensing means for controlling said printhead in response to movement of said tape;

means for directing said tape into operative engagement with said printhead and sensing means; and resist means operatively associated with said printhead for generating desired pressure at said printhead with said tape disposed between said printhead and resist means, whereby the images of selected characters are printed onto said tape by manually pulling said tape from the printing device.

27. The device of claim 24 including means operatively associated with said sensing means for insuring operative engagement between said tape and said sensing means.

28. The device of claim 25 wherein said sensing means includes a drive roller.

29. The device of claim 26 wherein said means operatively associated with said sensing means includes a roller.

30. The device of claim 24 wherein said resist means includes a roller.

* * * * *